No. 722,955. PATENTED MAR. 17, 1903.
W. Y. DONAHOE.
AGRICULTURAL MACHINE.
APPLICATION FILED JAN. 14, 1903.
NO MODEL.

Witnesses
Wm J Roerth
Edwin G. McKee

Inventor
William Y. Donahoe
By Herbert D. Lawson
Attorney

THE NORRIS PETERS CO., PHOTO-LITHO., WASHINGTON, D. C.

UNITED STATES PATENT OFFICE.

WILLIAM YOUNG DONAHOE, OF CASCADE, IOWA.

AGRICULTURAL MACHINE.

SPECIFICATION forming part of Letters Patent No. 722,955, dated March 17, 1903.

Application filed January 14, 1903. Serial No. 139,027. (No model.)

*To all whom it may concern:*

Be it known that I, WILLIAM YOUNG DONAHOE, a citizen of the United States, residing at Cascade, in the county of Dubuque and State of Iowa, have invented certain new and useful Improvements in Agricultural Machines, of which the following is a specification, reference being had therein to the accompanying drawings.

My invention relates to new and useful improvements in agricultural machines of that character adapted to be propelled by means of a motor arranged thereon; and its object is to provide means whereby the propelling-gearing may be utilized for guiding the machine while in motion.

A further object is to provide a novel arrangement of levers whereby these gears may be readily shifted by the operator.

With the above and other objects in view the invention consists in the novel construction and arrangement of the several parts hereinafter more fully described and claimed, and illustrated in the accompanying drawings, showing the preferred form of my invention, and in which—

Figure 1:
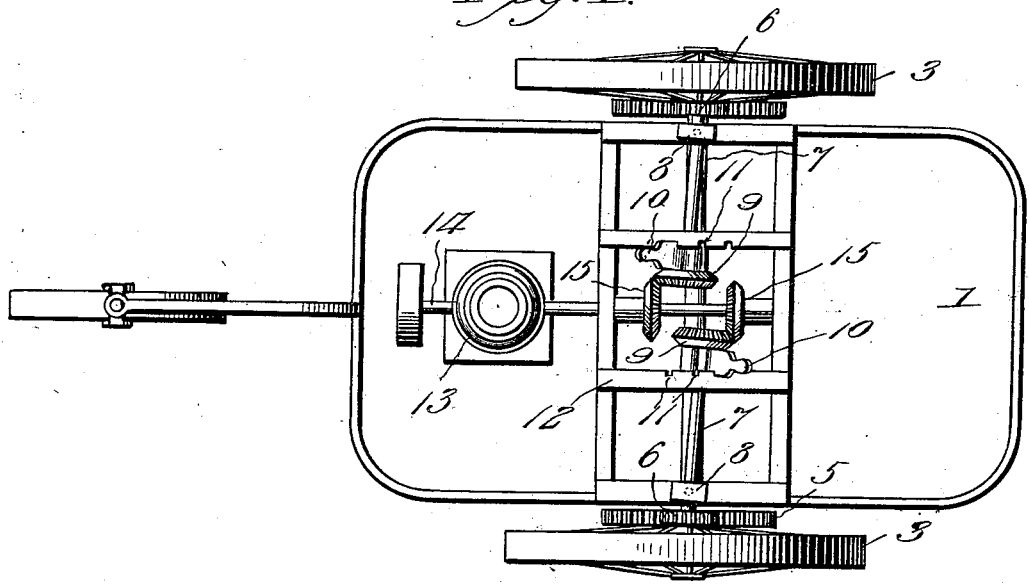
Figure 2:
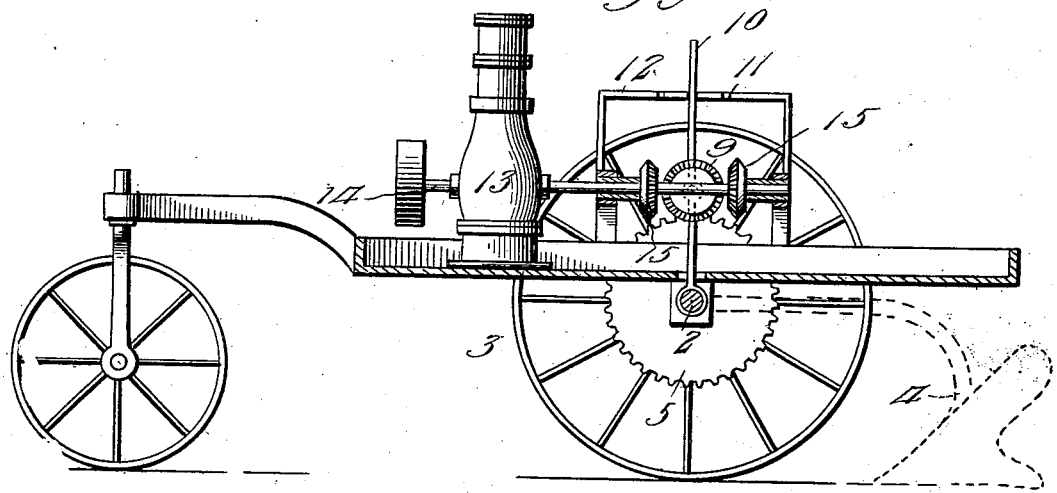

Figure 1 is a plan view of the machine. Fig. 2 is a longitudinal section therethrough.

Referring to the figures by numerals of reference, 1 is the body of a truck which is mounted on an axle 2, having traction-wheels 3 journaled thereon. A plow 4 or other agricultural implement may be connected to this machine in any suitable manner.

A gear 5 is secured to each of the traction-wheels 3 and is adapted to mesh with a small propelling-gear 6, the teeth of which are tapered toward the ends from the center, and this gear is secured to a shaft 7, which is mounted within a bearing-block 8, pivotally arranged upon frame 1 at the side thereof. The inner end of each shaft 7 has a bevel-gear 9 thereon, and levers 10 are connected to the shafts and are fulcrumed at their lower ends, preferably upon the axle 2, before referred to. These levers are adapted to be placed into engagement with any one of a series of notches 11, arranged within a locking-strip 12, secured adjacent thereto, and in this manner the bevel-gears 9 may be moved and locked in any desired position.

A motor 13 of suitable form is arranged upon the body 1 at any suitable point, and the power-shaft 14 thereof extends between the gears 9 and is provided with bevel-gears 15, having teeth upon their inner faces. These gears are adapted to revolve with the shaft and are at a distance apart greater than the diameter of the gears 9, before referred to.

I preferably provide three notches 11 in each of the locking-strips 12, and when the levers 10 are placed in engagement with the center notches the gears 9 are held out of engagement with both of the gears 15 upon the power-shaft. When it is desired to turn the machine in one direction, one of the gears 9 is moved forward or backward into engagement with the gear 15, and motion will thus be imparted to but one of the traction-wheels and the machine will be caused to turn. When it is desired to drive the machine straight forward, one of the gears 9 is placed in engagement with the front gear 15, while the other is placed in mesh with the remaining gear. To reverse the movement of the machine, as when it is desired to move backward, it is merely necessary to reverse the positions of the gears 9. It will be seen that by this arrangement of gears and levers the operator upon the machine may readily guide the same in any desired direction without the use of any complicated mechanism, such as is usually employed in devices of this character. As the teeth upon the drive-gear 6 are tapered from their centers toward their ends, it is obvious that they permit of a slight swinging movement of said gears without throwing them out of mesh with the gears on the traction-wheels.

In the foregoing description I have shown the preferred form of my invention; but I do not limit myself thereto, as I am aware that modifications may be made therein without departing from the spirit or sacrificing any of the advantages thereof, and I therefore reserve the right to make such changes and alterations as fairly fall within the scope of my invention.

Having thus fully described the invention, what is claimed as new is—

1. In a machine of the character described, the combination with an axle, traction-wheels thereon, and a body upon the axle, of gears secured to and revoluble with the traction-wheels, drive-gears meshing therewith and having outwardly-tapered teeth, pivoted bearings upon the body, drive-shafts journaled within said bearings and connected to the drive-gears, gears at the inner ends of the drive-shafts, a power-shaft, gears thereon, and means for moving the inner gears on the drive-shaft into mesh with the power-gears.

2. In a machine of the character described, the combination with an axle having traction-wheels thereon, and a body mounted upon the axle, of a gear secured to each of the traction-wheels, a pivoted bearing at each side of the body, a drive-shaft journaled in each bearing, a gear at the outer end of each drive-shaft and adapted to mesh with one of the gears of the traction-wheels, a gear at the inner end of each drive-shaft, a lever fulcrumed at its lower end and connected to one of the drive-shafts, a power-shaft, gears thereon adapted to be engaged by the inner gears on the drive-shafts, and means for locking the gears on the drive-shaft in adjusted position.

3. In a machine of the character described, the combination with an axle, traction-wheels thereon, and a body mounted upon the axle, of a gear secured to and revoluble with each traction-wheel, a power-shaft upon the body, oppositely-arranged gears thereon and movable therewith, pivoted bearings at the sides of the body, drive-shafts journaled therein, gears at the inner ends of said drive-shafts and at points between the power-gears, locking-strips adjacent to the drive-shafts, a lever connected to each drive-shaft and adapted to adjust the gear thereon from or toward either of the power-gears, and a gear at the outer end of each power-shaft adapted to mesh with the adjacent gear of the traction-wheel.

In testimony whereof I affix my signature in presence of two witnesses.

WILLIAM YOUNG DONAHOE.

Witnesses:
PETER N. SMITH,
J. W. BEATTY.